United States Patent Office 3,549,673
Patented Dec. 22, 1970

1

3,549,673
TOTAL SYNTHESIS OF 13β-SUBSTITUTED GONAPOLYEN-17α-OLS
Takuichi Miki, Amagasaki, and Kentaro Hiraga, Ikeda, Japan, assignors to Takeda Chemical Industries, Ltd., Osaka, Japan
No Drawing. Filed Mar. 9, 1967, Ser. No. 621,779
Claims priority, application Japan, Mar. 11, 1966, 41/15,171; Mar. 12, 1966, 41/15,477, 41/15,478; Apr. 29, 1966, 41/27,321; May 31, 1966, 41/35,256; Oct. 15, 1966, 41/67,992, 41/67,993, 41/67,994, 41/67,995, 41/67,996
Int. Cl. C07c 171/07; A61k 17/00
U.S. Cl. 260—397.5
4 Claims

ABSTRACT OF THE DISCLOSURE

In the total synthesis of 13β-substituted gonapolyen-17α - ols, 13-substituted-8,14-secogona 1,3,5(10),9-tetraene-14,17-diones are reduced to give, as a racemic mixture, (±)13 - substituted - 17α-hydroxy-8,14-secogona-1,3,5(10),9-tetraen-14-ones, which are readily optically separable. Natural type isomer of the racemic mixture is converted into natural type 13-substituted gonapolyen-17α-ol, while the antipode of the natural type isomer is convertible into starting 13 - substituted - 8,14 - secogona-1,3,5(10),9-tetraene-14,17-dione or into natural type 13-substituted gonapolyen-17α-ol.

The present invention relates to a novel process for producing a compound having a gonapolyen-17-one nucleus substituted in the 13-position by hydrocarbon residue, e.g. a lower alkyl, benzyl or phenyl radical, and to novel intermediates therefor. More concretely, this invention relates to an improved total synthesis of a compound having a 13-substituted gona-2,5(10)-dien-17-one nucleus or a compound having a 13-substituted gona-1,3,5(10)-trien-17-one nucleus and of novel intermediates therefor, e.g. a compound having a 13-substituted gona-1,3,5(10),8-tetraen-17α-ol nucleus, a compound having a 13-substituted gona-1,3,5(10),8,14-pentaen-17α-ol nucleus, a compound having a 13-substituted 8,14-secogona-1,3,5(10),9-tetraen-17α-ol nucleus, all of which have a hydrocarbon residue as a substituent at the 13-position.

The reason why partial synthesis has overwhelmed total synthesis in industrial production of steroids is due mainly to difficulty in treating a number of stereoisomers which are concomitantly produced either at the cyclization to form the steroid skeleton or at the saturation of the internuclear unsaturated bonds.

Recently, Hughes and Smith reported a stereo-selective total synthesis of (±)-estrone, starting from 5-(m-methoxyphenyl)pent-1-yne via (±)-estra-1,3,5(10),8,14-pentaen-17-one—see Chemistry and Industry, 1960, pages 1022–1023 with reference to Proceedings of Chemical Society, 1960, pages 74–75. Furthermore, more improved total syntheses of 19-nor-steroids have been reported independently by Smith et al., (Experientia, 19, 394–396 (1963, No. 8), Windholz et al. (Journal of Organic Chemistry, 28, 1092–1094 (1963)), Miki et al. (Proceedings of the Chemical Society, May 1963, 139) and Crispin et al. (ibid, January 1963, 22). Although these processes brought a hope of realizing an industrial total synthesis of steroids, the process is still accompanied by some difficulties, the most serious one of which is that these processes are accompanied necessarily with the production of useless stereoisomers.

The present invention is based upon the unexpected discovery that a compound (III)—(references in Roman numerals refer to the reaction chart, infra)— having a 13-substituted - 8,14 - secogona-1,3,5(10),9-tetraene-14,17-dione nucleus is readily reduced to produce predominantly (±)17α - hydroxy - 13 - substituted - 8,14 - secogona-1,3,5(10),9-tetraen-14-ones as a racemic mixture of a compound (IV–I) having a (—)17α-hydroxy-13-substituted-8,14-secogona-1,3,5(10),9-tetraen-14-one nucleus and of its antipode (IV–II) having a (+)17α-hydroxy-13-substituted - 8,14 - secogona-1,3,5(10),9-tetraen-14-one nucleus. The compounds (IV–I) can be converted into natural type gona-1,3,5(10)-trien-17-ones or gona-2,5(10)-dien-17-ones, while the antipodes (IV–II) can be converted into antipodes of the natural type gona-1,3,5(10)-trien-17-ones or gona-2,5(10)-dien-17-ones. Moreover, compounds (IV–II) are recoverable as gona-1,3,5(10),9-tetraen-14,17-diones (III) by oxidation of (IV–II) or are readily convertible to gona-1,3,5(10),8,14-pentaen-17α-ols (V); see aforesaid chart.

A principal object of the present invention is therefore to embody a process for producing compounds having a (—)17α - hydroxy - 13 - substituted - 8,14-secogona-1,3,5(10),9-tetraen-14-one nucleus, which are convertible into natural type 19-nor-steroids.

Another object of this invention is to provide a process for producing a compound (III) having a 13-substituted-8,14-secogona-1,3,5(10),9-tetraene-14,17-dione nucleus by oxidizing a compound (IV–II) having a (+)13-substituted - 17α-hydroxy-8,14-secogona-1,3,5(10),9-tetraen-14-one nucleus.

A further object of this invention is provide a process for producing a compound (V) having a (+)13-substituted-gona-1,3,5(10),8,14-pentaen-17α-ol nucleus from a compound (IV–II) having a (+)13-substituted-17α-hydroxy - 8,14-secogona-1,3,5(10),9-tetraen-14-one nucleus.

Still another object of this invention is to provide a novel compound having a 13-substituted-gona-polyene nucleus, e.g. 13 - substituted - 17α-hydroxy-8,14-secogona-1,3,5(10),9-tetraen-14-ones (IV).

Other objects will become apparent from the detailed description hereinafter provided.

Compounds having a 13-substituted-8,14-secogona-1,3,5(10),9-tetraene-14,17-dione nucleus, used as the starting materials of the present total synthesis, are prepared by per se known processes, for example by a condensation reaction between 1-hydroxy-1-vinyl-Tetralins (I) on the one hand and 2-substituted cyclopentane-1,3-diones (II) on the other hand.

The 1-hydroxy-1-vinyl-Tetralines have the general structure represented by the formula

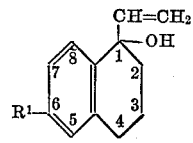

(I)

wherein R¹ is hydroxyl, etherified hydroxyl radical (e.g. methoxy, ethoxy, benzyloxy), or esterified hydroxyl radical (e.g. acetyloxy, nicotinoyloxy) and may be substituted, for example, at one or more of the positions 3, 4, 5, 7 and 8 in the tetralin skeleton, by a hydrocarbon residue with 1 to 7 carbon atoms such as lower alkyl (e.g. methyl, ethyl, n-propyl, isopropyl, n-butyl and isobutyl), phenyl or benzyl, and/or at one or more of the positions 5, 6, 7 and 8 in the skeleton, by a hydroxyl group, an etherified hydroxyl group (e.g. methoxy, ethoxy, n-propoxy and n-butoxy), an esterified hydroxyl group (e.g. acetoxy, propionyloxy and benzoyloxy), a halogen (e.g. fluorine and chlorine), a thio group (e.g. mercapto, methylthio, ethylthio and acetylthio) and an acyl group (e.g. acetyl, propionyl and benzoyl).

The 2-substituted cyclopentane-1,3-diones have a general structure represented by the formula:

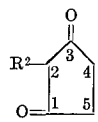

(II)

wherein R², the substituent at position 2, is a hydrocarbon residue, which is exemplified by lower alkyl (e.g. methyl, ethyl, n-propyl, isopropyl, n-butyl and isobutyl), phenyl and benzyl. One to three of the hydrogen atoms at the positions 4 and 5 of these 2-substituted cyclopentane-1,3-diones can further be replaced by one to four hydrocarbon residues as exemplified above.

The first step of the present invention comprises a selective reduction of a compound having a 13-substituted-8,14-secogona-1,3,5(10),9-tetraene - 14,17 - dione nucleus (III), to produce a compound having a (±)13-substituted-17α-hydroxy - 8,14 - secogona-1,3,5(10),9-tetraen-14-one nucleus (IV) which is substantially a mixture of (IV–I) and (IV–II).

A means for converting compound (III) to compound (IV) is realized by reduction of the former with a specified reducing agent.

Reducing agents applicable to the reduction of (III) to the corresponding tetraenols (IV) must be capable of reducing a carbonyl to a carbinol without attacking carbon-to-carbon double bonds. Preferably reducing agents include metallic hydrides and aluminum trialkoxides with up to 4 carbon atoms, for example, alkali metal boron hydrides (e.g. lithium boron hydride, sodium boron hydride and potassium boron hydride), alkali metal aluminum hydrides (e.g. lithium aluminum hydride, sodium aluminum hydride and potassium aluminum hydride), diethyl aluminum hydride and aluminum isopropoxide. The reaction is usually carried out in a solvent. Desirable solvent can be selected from usual organic solvents so long as the solvent does not disturb the reaction, and may be exemplified by methanol, ethanol, n-propanol, isopropanol, n-butanol, tetrahydrofuran, dioxane, ether, petroleum ether, chloroform, benzene and toluene. The hydride-type reducing agents as exemplified above are generally allowed to react with the compounds (III) at a rather low temperature, e.g. below an ambient temperature (about 20–25° C.) but higher than about −60° C., while the reaction of the alkoxide-type reducing agents is desirable accelerated by heating and is usually carried out in boiling isopropanol or ethanol which acts both as solvent and reactant.

The compounds (IV) thus produced are new and useful for the purpose of the present invention, and have the general structure shown by the formula:

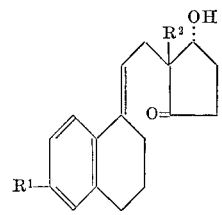

(IV)

wherein each of R¹ and R² has the same meaning as defined above in connection with Formulae I and II, and may have a substituent or substituents corresponding to the starting compounds (I) and (II). The product (IV) prepared by the above step substantially comprises a racemic mixture consisting of the following two stereoisomers (which are mirror images of each other):

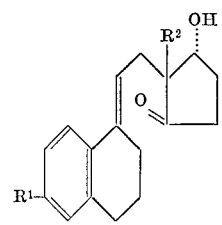

(IV–I)

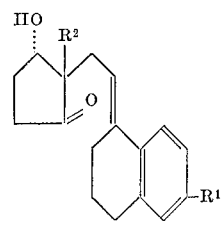

(IV–II)

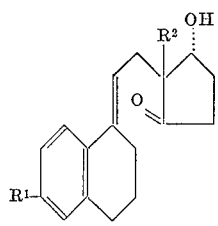

(IV–II)

Therefore, in order to obtain an optically active product, racemic resolution is required. Especially in the present invention, it is optimal to subject the above mentioned racemic mixture of compounds (IV–I) and (IV–II) to racemic resolution, because the undesired isomer is converted to a compound having a 13-substituted-8,14-secogona-1,3,5(10),9-tetraen-14,17-dione nucleus (III) or to a desired compound having a 13-substituted-gona-1,3,5 (10),8,14-pentaen-17α-ol nucleus, both methods being disclosed hereinbelow. The racemic resolution mentioned hereinafter is applicable to any of the compounds respectively having such a nucleus as a(±)13-substituted-gona-1,3,5(10),8,14-pentaen-17α-ol nucleus (V), a (±) 13-substituted-gona - 1,3,5(10),8 - tetran-17α-ol nucleus (VI), a (±)13 - substituted-gona-1,3,5(10)-trien-17α-ol nucleus (VII) and a (±)13-substituted-gona-2,5(10)-dien-17α-ol nucleus. But, in general, the racemic resolution should be effected as early as possible.

In the method of the present invention, racemic resolution is carried out easily by utilizing the generally existing 17α-hydroxyl group. One means for effecting the racemic resolution is through an optically active ester of the steroid and another means is enzymic hydrolysis of an acylated derivative of the product.

In the first means of racemic resolution, the 17α-hydroxy steroids are allowed to react with an optically active acid or its acid halide—e.g. 1-methoxyacetic acid or its chloride or bromide—to give a mixture of the corresponding diastereomers, separating respective diastereomers as usual, e.g. by fractional recrystallization, followed by hydrolysis to recover the optically active 17α-ols. In place of acylation with an optically active acid, the 17α-ol may be esterified with a dibasic—e.g. succinic acid, phthalic acid or sulfobenzoic acid—by means of its reactive derivative such as an anhydride or a chloride to give the corresponding hemiester, followed by the formation of salts with an optically active base such as ephedrine, strychnine and brucine.

In an alternative procedure for the racemic resolution, the 17α-ol is acylated in conventional manner to give the 17-acylate such as acetate, acetoacetate, glycinate, diethylaminoacetate, hemisuccinate and hemiadipate, and the resulting acylate is subjected to an enzymatic hydrolysis in an aqueous medium containing hydrolase which may be exemplified by diastase, lipase and trypsin. The technique of effecting the enzymic hydrolysis is set forth in U.S. Pat. No. 3,094,465 and the hydrolysis and the recovery of steroids can be carried out after the manner described in the said patent. Some microorganisms capable of producing said hydrolase may directly be brought into contact with the 17-acylates. Such microorganisms include, for example, those belonging to the general Rhizopus and Aspergillus.

Thus-obtained compounds having a 13-substituted-17α-hydroxy-8,14-secogona-1,3,5(10),9-tetraen-14-one nucleus are exemplified as follows:

(+) or (−)17α-hydroxy-3-methoxy-8,14-secoestra-1,3,5(10),9-tetraen-14-one;[1]
(+) or (−)17α-hydroxy-3-ethoxy-8,14-secoestra-1,3,5(10),9-tetraen-14-one;
(+) or (−)17α-hydroxy-13-ethyl-8,14-secogona-1,3,5(10),9-tetraen-14-one;
(+) or (−)17α-hydroxy-13-isopropyl-8,14-secogona-1,3,5(10),9-tetraen-14-one;
(+) or (−)17α-hydroxy-13-benzyl-8,14-secogona-1,3,5(10),9-tetraen-14-one;
(+) or (−)17α-hydroxy-13-phenyl-8,14-secogona-1,3,5(10),9-tetraen-14-one;
(+) or (−)17α-hydroxy-3-methoxy-13-ethyl-8,14-secogona-1,3,5(10),9-tetraen-14-one;
(+) or (−)17α-hydroxy-3-methoxy-13-n-propyl-8,14-secogona-1,3,5(10),9-tetraen-14-one;
(+) or (−)17α-hydroxy-3-methoxy-13-isopropyl-8,14-secogona-1,3,5(10),9-tetraen-14-one;
(+) or (−)17α-hydroxy-3-methoxy-13-phenyl-8,14-secogona-1,3,5(10),9-tetraen-14-one;
(+) or (−)17α-hydroxy-3-methoxy-13-benzyl-8,14-secogona-1,3,5(10),9-tetraen-14-one;
(+) or (−)17α-hydroxy-8,14-secoestra-1,3,5(10),9-tetraen-14-one;

The second step of the present total synthesis is an intramolecular cyclization of the compounds (IV–I), resulting in closure of the ring C to give compounds having a (−) 13-substituted-17α-hydroxy-gona-1,3,5(10),8,14-pentaen-17-one nucleus (V).

The cyclization is accelerated by the use of an acid catalyst, which is exemplified by inorganic acids or their anhydrides (e.g. hydrochloric acid, sulfuric acid, phosphoric acid, phosphorus pentoxide and polyphosphoric acid), hydrogen salts or partial esters of these polybasic inorganic acids (e.g. sodium hydrogen sulfate, monosodium dihydrogen phosphate and monomethyl sulfate), their pyridine complexes (e.g. pyridine-hydrobromic acid complex), sulfonic acids (e.g. methanesulfonic acid, ethanesulfonic acid, benzenesulfonic acid and toluenesulfonic acid), sulfonated styrene-type cation exchange resins, so-called Lewis acids (e.g. aluminum chloride, boron trifluoride and tin chloride) and silica gel.

This reaction does not require any solvent. However, the reaction can be effected more smoothly by the use of a suitable solvent, such e.g. as benzene, toluene, xylene, tetrahydrofuran, dibutyl ether, methanol, ethanol and propanol. This reaction is also accelerated by heat and takes place easily under mild heating. If necessary, the reaction may be carried out in the neighborhood of 100° C. or higher.

The reaction in this step takes place via 14-hydroxy-gona-1,3,5(10),9-tetraen-17α-ols as intermediates, because such mild conditions as the use of silica gel often cause the production of these intermediates, which are readily converted by further contact with a rather drastic acid catalyst to yield the desired compounds (V).

The resulting compound having a 13-substituted gona-1,3,5(10),8,14-pentaen-17α-ol nucleus (V) have the general structure shown by the formula:

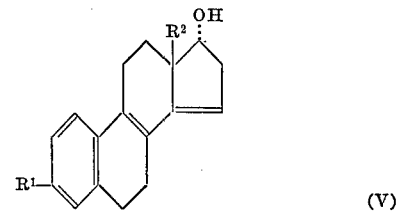

(V)

wherein each of $R^1$ and $R^2$ is as defined above, and include the substituent or substituents corresponding to the starting compounds, when the latter are substituted; that is, at any of the positions 1, 2, 3, 6, 7, 15 and 16, one or more of the hydrocarbon residues exemplified with regard to compounds (I) and (II), and/or at any of the positions 1, 2 and 3 hydroxyl, etherified hydroxyl, esterified hydroxyl, halogen and thio, as exemplified with regard to compounds (I). Among them, those especially advantageous for the purpose include, for example:

(+) or (−)3-methoxyestra - 1,3,5(10),8,14-pentaen-17α-ol;[1]
(+) or (−)3-ethoxyestra-1,3,5,(10),8,14-pentaen-17α-ol;
(+) or (−)3-n-propoxyestra-1,3,5(10),8,14-pentaen-17a-old;
(+) or (−)13-ethylgona-1,3,5(10),8,14-pentaen-17a-ol;
(+) or (−)13-isopropylgona-1,3,5(10),8,14-pentaen-17a-ol;
(+) or (−)13-phenylgona-1,3,5(10),8,14-pentaen-17a-ol;
(+) or (−)13-benzylgona-1,3,5(10),8,14-pentaen-17α-ol;
(+) or (−)3 - methoxy-13-ethylgona-1,3,5,(10),8,14-pentaen-17a-ol;
(+) or (−)3-methoxy-13-n-propylgona-1,3,5(10),8,14-pentaen-17a-ol;
(+) or (−)3-methoxy-13-phenylgona-1,3,5(10),8,14-pentaen-17α-ol;
(+) or (−)3 - methoxy-13-benzylgona-1,3,5(10),8,14-pentaen-17α-ol;
(+) or (−)estra-1,3,5(10),8,14-pentaen-17a-ol;

---

[1] Note.—The (−) compound here corresponds to the natural type steroid and the (+) compound is ("unnatural") antipode thereof.

[1] Note.—The (−) compound here corresponds to the natural type steroid and the (+) compound is ("unnatural") antipode thereof.

All the exemplified compounds show characteristic ultraviolet absorption bands in the range of the wave length of about 310 millimicrons.

The compounds (V) can be converted stereoselectively and exclusively to the corresponding 13-substituted gona-1,3,5(10)8-tetraen-17α-ols (VI) in which the hydrogen attached to the position 14 is oriented to α-configuration; that is, the same configuration as estrogenic steroids obtained from natural sources.

The conversion of compounds (V) to compounds (VI) is conveniently effected by so-called catalytic reduction. For this purpose, Raney nickel or palladium catalyst is preferably used. The reaction can be carried out in a suitable solvent which is exemplified by dioxane, tetrahydrofuran, ether, methonal, ethanol and acetic acid. The reaction usually takes place at ambient temperature (15 to 30° C.); but, if required, it may be carried out at an elevated or lowered temperature. At any event, too drastic conditions should be avoided for this reaction, since further hydrogenation may take place at the positions 8 and 9 which may result in opposite configuration of the hydrogen at the position 8 in the product.

The compounds (VI) thus produced are also new and useful for the purpose of the present invention and have the general formula shown by the formula:

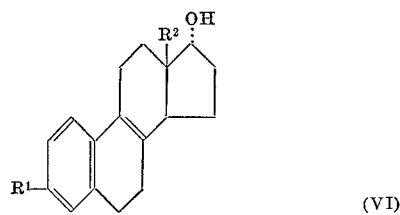

(VI)

wherein each of $R^1$ and $R^2$ is as defined above. They may also contain, for example, at any of the positions 1, 2, 3, 6, 7, 15 and 16, one or more hydrocarbon residues as described with regard to compounds (I) and (II), and/or at any of the positions 1, 2 and 3, hydroxyl, etherified hydroxyl (e.g. methoxy, ethoxy, propoxy and butoxy) as well as esterified hydroxyl, halogen, and thio, as described with regard to compounds (I). Among them, the ones especially advantageous for the purpose include, for example:

(+) or (−)3-methoxyestra-1,3,5(10),8-tetraen-17α-ol; [1]
(+) or (−)3-ethoxyestra-1,3,5(10),8-tetraen-17α-ol;
(+) or (−)13-ethylgona-1,3,5(10),8-tetraen-17α-ol;
(+) or (−)13-isopropylgona-1,3,5(10),8-tetraen-17α-ol;
(+) or (−)13-phenylgona-1,3,5(10),8-tetraen-17α-ol;
(+) or (−)13-benzylgona-1,3,5(10),8-tetraen-17α-ol;
(+) or (−)3-methoxy-13-ethylgona-1,3,5(10),8-tetraen-17α-ol;
(+) or (−)3-methoxy-13-isopropylgona-1,3,5(10),8-tetraen-17α-ol;
(+) or (−)3 - methoxy - 13 - phenylgona - 1,3,5(10),8 - tetraen-17α-ol;
(+) or (−)3 - methoxy - 13 - benzylgona - 1,3,5(10,8-tetraen-17α-ol;
(+) or (−)estra-1,3,5(10),8-tetraen-17α-ol;

All the exemplified compounds show characteristic absorption bends in the range of the wave lengths of about 273–281 millimicrons.

[1] NOTE.—The (−) compound here corresponds to the natural type steroid and the (+) compound is ("unnatural") antipode thereof.

Thus-prepared compounds (VI) are subjected to a further reduction to saturate the double bond at the position 8.

The reduction is preferably carried out by allowing an alkali metal to react with the compounds (VI) in liquid ammonia. The alkali metal may be lithium, sodium and potassium, for example. The reaction is carried out in liquid ammonia or its mixture with an inert solvent. The inert solvents for the purpose include, for example, ether, dioxane and tetrahydrofuran. Since the agent is rather violent, the reaction is usually brought about at a lowered temperature, i.e. below ambient temperature to about −30° C.

In this way, there are produced with a good overall yield 13-substituted gona-1,3,5(10)-trien-17α-ols (VII), which include estradiol or its related compounds as well as a number of novel compounds which also show estrogenic activity, and which have the general structure shown by the formula:

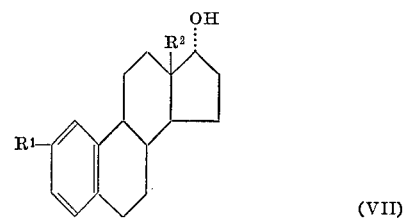

(VII)

wherein each of $R^1$ and $R^2$ is as defined above, and may have the same substituent or substituents as in compounds (VI) used for the production thereof.

Thus-prepared compounds (VII) can be reduced to saturate the double bond at aromatic ring to produce a compound having a 13-substituted-gona-2,5(10)-dien-17α-ol nucleus (VIII). The reduction may preferably be carried out by allowing an alkali metal to react with the compounds (VII) in liquid ammonia containing a proton source such as alcohols having up to 6 carbon atoms, e.g. methanol, ethanol, tertiary-butanol, etc., other conditions being the same as the above. In the same manner as this reaction, the compound having a 13-substituted-1,3,5(10), 8-tetraen-17α-ol (VI) nucleus may also be converted to the same product (VIII), the double bond at the position 8 as well as the double bond on the aromatic ring being saturated.

Thus-obtained trienols (VII) and dienols (VIII) can be respectively led to a compound having a 13-substituted-gona-trien-17-one nucleus (X) and to a compound having a 13-substituted-gona-dien-17-one nucleus (IX), both being the same configuration as estrogenic steroids obtained from natural sources.

The reaction may be carried out by e.g. Oppenauer oxidation employing aluminum isopropoxide, aluminum ethoxide, aluminum phenoxide, pyridine-chromic acid anhydride, etc., by an oxidation employing pyridine-chromic acid anhydride or dimethylsulfoxide-dicyclohexylcarbodiimide, by an oxidation employing microorganisms, etc. These reactions are preferably carried out under neutral or alkaline conditions.

All reactions mentioned hereinbefore are applicable to racemic mixtures as well as to optical isomers. However, as already mentioned hereinbefore, it is preferable to subject the compound having a (±)13-substituted-17α-hydroxy-8,14-secogona-1,3,5(10),9-tetraen-14-one nucleus (IV) to optical resolution, for the purpose of recovering the unnatural type compound having a (+)13-substituted-18,14-secogona-1,3,5(10),9-tetraen-17α-ol nucleus (IV–II).

Such recovering process is carried out by allowing said compound (IV-II) to react with an oxidizing agent, whereupon a compound having a 13-substituted-8,14-secogona-1,3,5(10),9-tetraene-14,17-dione nucleus (III) is obtained. Oxidizing agents applicable to this reaction must be capable of oxidizing hydroxyl radical to oxo radical without attacking carbon-to-carbon double bond. Preferable oxidizing agents include, for example chromic acid, aluminum alkoxide and ketones (Oppenauer oxidation), dimethylsulfoxide-dicyclohexylcarbodiimido, etc. Thus obtained secodiones (III) may be used as the starting materials of the present process.

Alternatively, the compound having a (+)13-substituted - 8,14 - secogona-1,3,5(10),9-tetraen-17α-ol nucleus (IV-II) may be converted to a compound having a (—)-13-substituted-gona-1,3,5(10),8,14-pentaen-17α-ol nucleus (V), in which the substituent attached to the position 13 is oriented to β-configuration, that is, the same configuration as estrogenic steriods obtained from natural sources. The conversion process comprises the following steps:

(1) Allowing the secotetrane-17α-ol compounds (IV-II), to react with a conventional acylating agent to produce a compound having a (+)13-substituted-17α-acyloxy - 8,14 - secogona-1,3,5(10),9-tetraen-14-one nucleus (XI).

(2) Reducing the so-obtained (+)17α-hydroxy-secotetraenones (XI), with a metallic hydride compound to produce a compound having a (+)13-substituted-17α-acyloxy-8,14-secogona - 1,3,5(10),9-tetraen-14-ol nucleus (XII). The reaction conditions of this step are the same as employed in the reducing process of secodions (III) to seco-17α-ols (IV).

(3) Thus-obtained 17α-acyloxy-seconenol (XII) is allowed to contact with acid catalyst to produce a compound having a (+)13-substituted-17α-acyloxy-9,14-oxido - 8,14 - secogona-1,3,5(10),9-tetraen nucleus (XIII). The reaction conditions of this step are similar to those employed in the cyclization process of secotetraenols (IV) to obtain pentaenols (V).

(4) Thus-obtained 17α-acryloxy-oxide (XIII) is subjected to hydrolysis to produce a compound having a (+)13 - substituted-9,14-oxido-8,14-secogona-1,3,5(10),9-tetraen-17-ol nucleus (XIV). For the hydrolysis, there are employable any conventional conditions for hydrolysis, for example, in the presence of alkali metal hydroxide (e.g. sodium hydroxide, potassium hydroxide), hydrolyase (e.g. maltase, diastase), and so on.

(5) Thus-obtained oxido-tetraenol (XIV) is subjected to oxidation to produce a compound having a (—)13-substituted-9,14-oxido-8,14-secoestra- 1,3,5(10),9-tetraen-17-one nucleus (V). This reaction is carried out under the same conditions as mentioned above in the process of oxidizing trienols (VII) or dienols (VIII) to trienons (X) or dienone (I) respectively and the recovering process oxidizing (+) secotetraenols (IV-II) to secodiones (III).

(6) And finally thus-obtained oxido-17-one (XV) is subjected to contact with acid catalyst to produce a compound having a (— 13-substituted-gono-1,3,5(10),8,14-pentaen-17α-ol nucleus. This cyclization reaction is carried out under the same conditions as employed in the process subjecting the secotetraenols (IV-I) to cyclize to pentaenols (V).

The following reaction scheme diagrammatically visualizes the several conversions according to the present invention.

The 13-substituted-gonatrien-17-ones (X) include estrone which is known and useful as estrogenic hormone in itself or as an intermediate for synthesis of many useful 19-nor-steroids. The 13 - substituted-gona - 1,3,5(10)-trien-17α-ols (VI) includes α-estradiol which is also known and useful as an inhibitor of the anterior pituitary gland or as an intermediate for synthesizing many useful 19-nor-steroids. The process of the present invention thus provides a new and improved means for the total synthesis of inter alia estrone or α-estradiol, because of its high over-all yield at every stage of the reaction sequence and because of 100% convertibility of starting material (III) into natural type steroids, e.g. estrone or α-estradiol.

The 13-substituted-gonatrien-17-ones (X) and the 13-substituted-gonatrien-17α-ols (VII) also include novel compounds, especially where the substituent at 13-position is e.g. ethyl, propyl, isopropyl, butyl, isobutyl, phenyl or benzyl. These novel compounds as well as the 13-substituted gonapentaen- or tetran-17α-ols (V) or (VI) show e.g. activity in lowering cholesterol level in the blood.

At the same time, the novel 13-substituted-17α-hydroxy-8, 14 - secogona-1,3,5(10),9 - tetren-14-ones (IV), optically active isomers thereof, the 13-substituted gona-1,3,5(10),8,14-pentaen-17α-ols (V), the 13-substituted gona-1,3,5(10),8-tetraen-17α-ols (VI) and other optically active 8,14-seco-steroids (XI), (XII), (XIII), (XIV) and (XV) are all useful as intermediates for the total synthesis of the useful 19-nor-steroids.

It is to be understood that the following examples are solely for the purpose of illustration and not to be construed as limitations of this invention, and that many variations may be resorted to without departing from the spirit and scope of this invention. In examples, "g." and "ml." are "gram(s)" and "milliliter(s)," respectively. Temperatures are uncorrected, and percentages are all on the weight basis.

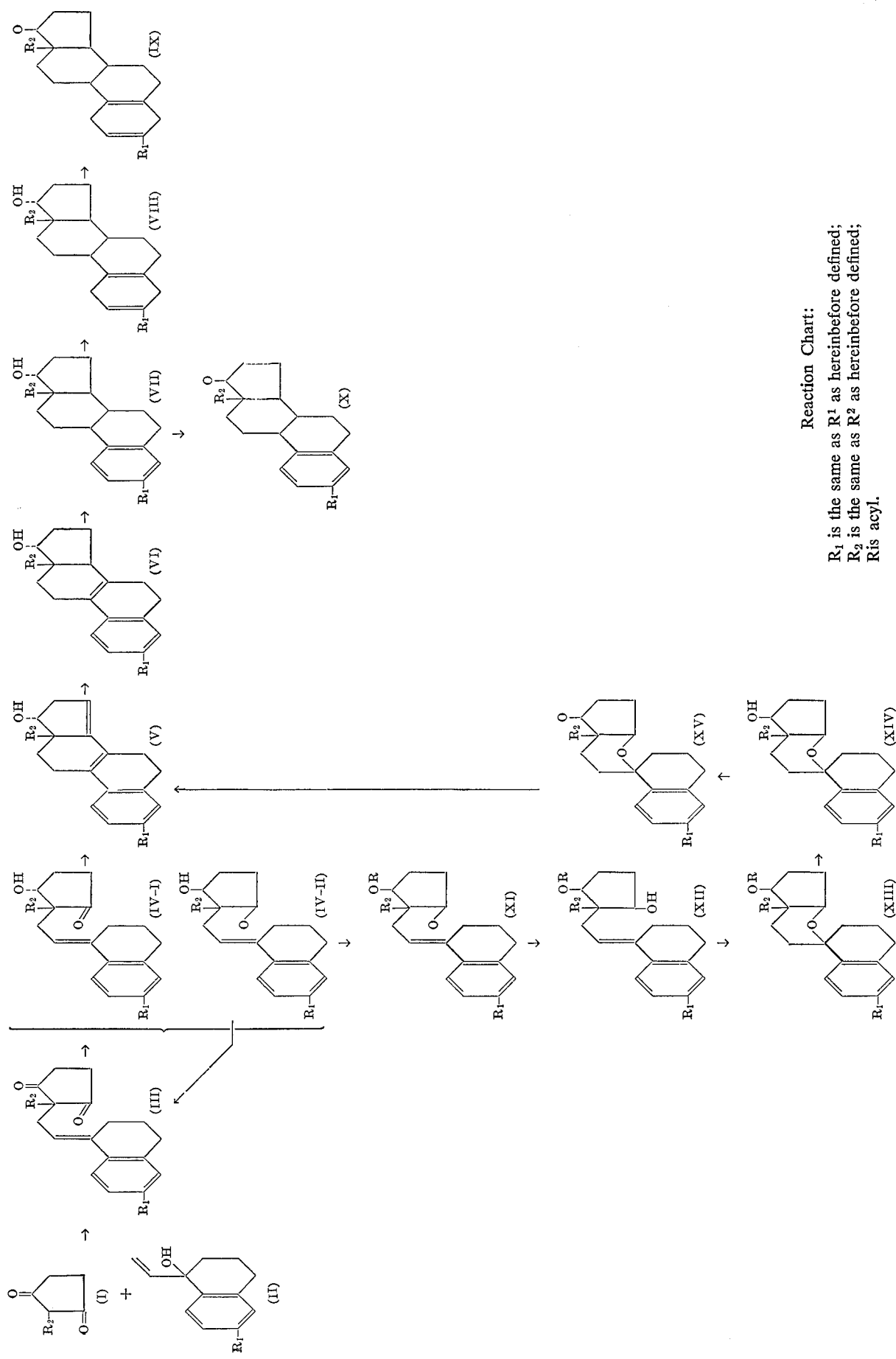
Reaction Chart:
$R_1$ is the same as $R^1$ as hereinbefore defined;
$R_2$ is the same as $R^2$ as hereinbefore defined;
R is acyl.

EXAMPLE 1

(1) (±)3-methoxy-17α-hydroxy-8,14-secoestra-1,3,5(10),9-tetraen-14-one

To a solution of 2 g. of 3-methoxy-8,14-secoestra-1,3,5(10),9-tetraene-14,17-dione in 100 ml. of methanol there is added 0.08 g. of sodium borohydride under ice-cooling and the mixture is stirred under the same conditions. After 2 hours, the reaction solution is shaken with a mixture of water and ether, and the ether layer is washed with water and dried, followed by evaporation of the solvent to give 1.8 g. of (±)3-methoxy-17α-hydroxy-8,14-secoestra-1,3,5(10),9-tetraen-14-one. The product is recrystallized from a mixture of ether and hexane to give pure product melting at 74° C.

*Elementary analysis.*—Calculated for $C_{19}H_{24}O_3$ (percent): C, 76.00; H, 8.00. Found (percent): C, 76.27; H, 7.92.

Ultraviolet absorption:

$$\lambda_{max.}^{ethano}$$

266 mμ (ε-19300).

(2–1) (±)3-methoxyestra-1,3,5(10),8,14-pentaen-17α-ol

To a solution of 1.7 g. of (±)3-methoxy-17α-hydroxy-8,14-secoestra-1,3,5(10),9-tetraen-14-one in 50 ml. of methanol, there is added 5 ml. of 6-normal hydrochloric acid, and the mixture solution is left standing at room temperature for 2 hours, followed by shaking with a mixture of water and ether. After the ether layer is washed with an aqueous solution of sodium hydrogen carbonate and then with water, it is dried and subjected to evaporation to remove the solvent. The residue is chromatographed on a column packed with 80 g. of silica gel and 1.2 g. of (±)3 - methoxy - 9,14 - oxido-8,14-secoestra-1,3,5(10)-trien-17-one is obtained from the eluate with a mixture of benzene and ether (9:1). Melting point: 83° C.

*Elementary analysis.*—Calculated for $C_{19}H_{24}O_3$ (percent): C, 76.00; H, 8.00. Found (percent): C, 75.88; H, 7.97.

Ultraviolet absorption:

$$\lambda_{max.}^{ethanol}$$

mμ(ε); 255 (8850), 275 (1690), 282 (1665).

Infrared absorption:

$$\nu_{max.}^{nujol}$$

cm.$^{-1}$; 1740.

To a solution of 1.1 g. of thus-obtained oxide in 50 ml. of methanol, there is added 7 ml. of concentrated hydrochloric acid, and the mixture is refluxed for 30 minutes, followed by shaking with a mixture of water and ether. After the ether layer is washed with an aqueous solution of sodium hydrogen carbonate and then water and dried, it is subjected to evaporation to remove the ether to give 1 g. of (±)3-methoxy-estra-1,3,5(10),8,14-pentaen-17-ol as a yellowish oil.

Ultraviolet absorption:

$$\lambda_{max.}^{ethanol}$$

mμ(ε). 311 (20000).

Infrared absorption:

$$\nu_{max.}^{tetrachloromethane}$$

cm.$^{-1}$: 3400 (OH).

(2–2) (±)3-methoxyestra-1,3,5(10),8,14-pentaen-17α-ol

To a solution of 1 g. of (±)3-methoxy-17α-hydroxy-8,14-secoestra-1,3,5(10),9-tetraen-14-one in 50 ml. of methanol there is added 7 ml. of concentrated hydrochloric acid and the mixture is refluxed for 30 minutes, followed by shaking with a mixture of water and ether. After the ether layer is washed with an aqueous solution of sodium hydrogen carbonate and then with water and dried, it is subjected to evaporation to remove the solvent to give 0.8 g. of (±)3-methoxyestra-1,3,5(10),8,14-pentaen-17α-ol as a yellowish oil.

(3) (±)3-methoxyestra-1,3,5(10),8-tetraen-17α-ol

A solution of 0.9 g. of (±)3-methoxyestra-1,3,5(10),8,14-pentaen-17α-ol in 80 ml. of dioxane is subjected to catalytic hydrogenation in the presence of 1 g. of Raney nickel. Filtering off the catalyst, the filtrate is condensed under reduced pressure to give a residue, from which 0.5 g. of crystals of (±)3-methoxyestra-1,3,5(10),8-teraen-17α-ol are obtained. The crystals are recrystallized from ethyl acetate. Melting point: 161° C.

*Elementary analysis.*—Calculated for $C_{19}H_{24}O_2$ (percent): C, 80.28; H, 8.45. Found (percent): C, 79.97; H, 8.41.

Ultraviolet absorption:

$$\lambda_{max.}^{ethanol}$$

mμ (ε): 277 (15700).

(4) (±)3-methoxyestra-1,3,5(10)-trien-17α-ol

To a solution of 0.4 g. of (±)3-methoxyestra-1,3,5(10),8-tetraen-17α-ol in a mixture of 70 ml. of liquid ammonia, 20 ml. of dioxane and 40 ml. of ether, 0.7 g. of metallic potassium, there is added under cooling at −50° C. and the mixture is stirred for 2 hours under the same conditions. To the reaction solution, there is added 2 g. of ammonium chloride and then the resultant solution is left standing at room temperature to remove ammonia. To the residue, there is added water and the mixture is extracted with ether. After the ether layer is washed with water and dried, it is condensed to give a residue, which is recrystallized from hexane to obtain 0.2 g. of (±)3-methoxyestra-1,3,5(10)-trien-17α-ol as crystals melting at 94° C.

*Elementary analysis.*—Calculated for $C_{19}H_{26}O_2$ (percent): C, 79.72; H, 9.09. Found (percent): C, 79.98; H, 9.15.

Ultraviolet absorption:

$$\lambda_{max.}^{ethanol}$$

mμ (ε): 280 (1980), 288 (1900).

(5) (±)3-methoxyestra-1,3,5(10)-trien-17α-one

To a solution of 0.2 g. of (±)3-methoxyestra-1,3,5-(10)-trien-17α-ol in 10 ml. of acetone, there is added under stirring 0.2 ml. of a solution in which 26.72 g. of chromic anhydride and 23 ml. of concentrated sulfuric acid are dissolved in water to give 100 ml. of total volume, and the mixture solution is kept standing for 20 minutes at room temperature. To the reaction solution, there is added water to precipitate crystals, which are recrystallized from methanol to give 0.15 g. of (±)3-methoxyestra-1,3,5(10)-trien - 17 - one. Melting point: 140° C.

(6) (±)3-methoxyestra-2,5(10)-dien-17α-ol

To a solution of 1 g. of (±)3-methoxyestra-1,3,5(10),8-tetraen-17α-ol in a mixture of 50 ml. of dioxane, 50 ml. of ether and 150 ml. of liquid ammonia, said solution being cooled at −50° C., there is added 2 g. of metallic lithium and the mixture is stirred. After 30 minutes, 50 ml. of ethanol is added dropwise to the reaction solution and then the resultant solution is left standing at room temperature to remove ammonia. The residue is shaken with a mixture of water and ether, and the ether layer is, after washed with water and dried, subjected to evaporation to remove the solvent to give crystals of (±)3-methoxyestra-2,5(10)-dien-17α-ol, which are recrystallized from a mixture of ether and hexane to give colorless needles melting at 119° C. Yield: 0.6 g.

(7–1) (±)3-methoxyestra-2,5(10)-dien-17-one

In a solution of 1.5 ml. of benzene, 1.5 ml. of dimethylsulfoxide, 0.8 ml. of pyridine and 0.04 ml. of trifluoroacetic acid, there is dissolved 0.2 g. of (±)3-methoxyestra - 2,5(10)-dien-17α-ol and to the resultant solution there is added 0.62 g. of dicyclohexylcarbodiimide, followed by allowing the mixture to stand for 6 hours at room temperature. Then, to the reaction mixture is added a solution of 25 ml. of ether, 0.3 g. of oxalic acid and 6 ml. of methanol, and the mixture solution is left standing. After 30 minutes, the produced dicyclohexylurea is filtered off and the ether layer is separated from the filtrate. After the ether layer is washed with an aqueous solution of sodium hydrogen carbonate and then water, and dried, it is subjected to evaporation to remove the solvent and the residue is recrystallized from ethanol to give crystals of 0.18 g. of (±)3-methoxyestra-2,5(10)-dien-17-one as crystals melting at 115° C.

*Elementary analysis.*—Calculated for $C_{19}H_{26}O_2$ (percent): C, 79.68; H, 9.15. Found (percent): C, 79.53; H, 9.22.

(7–2) (±)3-methoxyestra-2,5(10)-dien-17-one

In a mixed solution of 2 g. cyclohexanone and 50 ml. of toluene, there is dissolved 0.2 g. of (±)3-methoxyestra-2,5(10)-dien-17α-ol and the resultant solution is concentrated to 20 ml. To the solution, there is added 0.2 g. of aluminum isoproproxide and the mixture is refluxed for 3 hours. 30 ml. of water is added to the reaction solution and the mixture, after being neutralized with dilute sulfuric acid, is subjected to steam distillation. Then the residue is extracted with ether and the ether layer, after being washed with water and dried, is subjected to evaporation to remove the solvent. The residue is recrystallized from hexane to give 0.1 g. of (±)3-methoxyestra-2,5(10)-dien-17-one as crystals melting at 115° C.

Infrared absorption:

cm.$^{-1}$, 1743 (C=O).

EXAMPLE 2

(1) (±)3-methoxy-13β-ethyl-17α-hydroxy-8,14-secogona-1,3,5(10),9-tetraen-14-one

To a solution of 1.3 g. of 3-methoxy-13β-ethyl-8,14-secogona-1,3,5(10),9-tetraene-14,17-dione in 80 ml. of methanol, there is added 0.08 g. of sodium borohydride under ice-cooling and the mixture is stirred under the same conditions. After 2 hours, water and ether are added to the reaction solution and the resultant mixture is shaken, followed by separation of ether layer. After the ether layer is washed with water and dried, it is subjected to evaporation to remove the solvent to give 1.3 g. of yellowish oily residue of (±)3-methoxy-13β-ethyl-17α-hydroxy - 8,14 - secogona - 1,3,5(10),9-tetraen-14-one. The oil is purified by the chromatography method using silica gel.

Infrared absorption:

$\nu_{max.}^{nujol}$ cm.$^{-1}$, 3400, 1725.

(2–1) (±)3-methoxy-13β-ethylgona-1,3,5(10) 8,14-pentaen-17α-ol

To a solution of 0.5 g. of (±)3-methoxy-13β-ethyl-17α-hydroxy-8,14-secogona-1,3,5(10),9-tetraen-14-one in 40 ml. of methanol, there is added 5 drops of concentrated hydrochloric acid and the resultant solution is left standing for 2 hours at room temperature. Then the reaction solution is shaken with water and ether, followed by separation of the ether layer. After the ether layer is washed with an aqueous solution of sodium hydrogen carbonate and with water, it is subjected to evaporation to remove the solvent. The residue is subjected to column chromatography with 20 g. of silica gel and the eluate with a mixture of benzene and ether (9:1) is condensed to give 0.2 g. of (±)3-methoxy-9,14-oxido-13β-ethyl-8,14-secogona-1,3,5(10)-trien-17-one. Melting point: 64° C.

*Elementary analysis.*—Calculated for $C_{20}H_{26}O_3$ (percent): C, 76.43; H, 8.33. Found (percent): C, 76.57; H, 8.33.

To a solution of 0.1 g. of (±)3-methoxy-9,14-oxido-13β-ethyl-8,14-secogona-1,3,5(10)-trien-17-one in 10 ml. of methanol, there is added 1 ml. of concentrated hydrochloric acid and the mixed solution is refluxed for 30 minutes. Then the reaction solution is shaken with a mixture of water and ether, followed by separation of the ether layer. After the ether layer is washed with an aqueous solution of sodium hydrogen carbonate and then with water and dried, the ether layer is subjected to evaporation to remove the solvent and to give 0.1 g. of (±)3-methoxy-13β-ethylgona-1,3,5(10),8,14 - pentaen-17α-ol as yellowish oil.

Ultraviolet absorption:

$\lambda_{max.}^{ethanol}$ mμ(ε): 309 (20000).

Infrared absorption:

cm.$^{-1}$: 3400.

(2–2) (±)3-methoxy-13β-ethylgona-1,3,5(10) 8,14-pentaen-17α-ol

To a solution of 1 g. of (±)3-methoxy-13β-ethyl-17α-hydroxy-8,14-secogona-1,3,5(10),9-tetraen-14-one in 40 ml. of methanol, there is added 10 ml. of concentrated hydrochloric acid and the mixture is refluxed for 30 minutes. Water and ether are added to the reaction solution and the resultant mixture is shaken, followed by separation of the ether layer. After the ether layer is washed with an aqueous solution of sodium hydrogen carbonate and with water and dried, it is subjected to evaporation to remove the solvent giving 0.9 g. of (±)3-methoxy-13β-ethylgona-1,3,5(10),8,14-pentaen-17α-ol as yellowish oil.

(3) (±)3-methoxy-13β-ethylgona-1,3,5(10) 8-tetraen-17α-ol

A solution of 0.9 g. of (±)3-methoxy-13β-ethylgona-1,3,5(10),8,14-pentaen-17α-ol dissolved in 80 ml. of dioxane is subjected to catalytic hydrogenation in the presence of 0.5 g. of Raney nickel. Then the reaction solution is subjected to filtration to separate the catalyst and the filtrate is condensed under reduced pressure to precipitate crystals of (±)3-methoxy-13β-ethylgona-1,3,5(10),8-tetraen-17α-ol. The crystals are recrystallized from methanol. Melting point: 141–3° C. Yield: 0.6 g.

*Elementary analysis.*—Calculated for $C_{20}H_{26}O_2$ (percent): C, 80.49; H, 8.78. Found (percent): C, 80.36; H, 8.64.

Ultraviolet absorption:

$\lambda_{max.}^{ethanol}$ mμ(ε): 29 (16400).

(4) (±)3-methoxy-13β-ethylgona-1,3,5(10) trien-17α-ol

In a mixture of 40 ml. of liquid-ammonia and 10 ml. of dioxane, there is dissolved 0.3 g. of (±)3-methoxy-13β-ethylgona-1,3,5(10),8-tetraen-17α-ol, and the solution is cooled to −50° C. To the thus-cooled solution, there is added 0.5 g. of metallic potassium, followed by stirring for 2 hours. To the reaction solution, there is added 2 g. of amomnium chloride and then the resultant solution is left standing at room temperature to remove ammonia. To the residue, there is added water, followed by extraction with ether. After the ether layer is washed with water and dried, it is subjected to evaporation to remove the solvent. The residue is recrystallized from an aqueous solution of methanol to give 0.1 g. of (±)3-methoxy-13β-ethylgona-1,3,5(10)-trien-17α-ol as crystals melting at 71–73° C (5) (±)3-methoxy-13β-ethylgona-1,3,5(10) trien-17-one To a solution of 0.02 g. of (±)3-methoxy-13β-ethylgona-1,3,5(10)-trien-17α-ol in 5 ml. of acetone, there is added 0.2 ml. of an aqueous solution containing 26.72 g. of chromic acid anhydride and 23 ml. of concentrated sulfuric acid per 100 ml., followed by stirring. To the reaction solution, after being left standing for 20 minutes at room temperature, there is added water to precipitate crystals, which are recrystallized from methanol to give 0.015 g. of (±)3-methoxy-13β-ethylgona-1,3,5(10)-trien-17-one. Melting point: 128° C.

(6) (±)3-methoxy-13β-ethylgona-2,5(10)-dien-17α-ol

In a mixture of 20 ml. of dioxane, 20 ml. of ether and 100 ml. of liquid ammonia, there is dissolved 0.5 g. of (±)3 - methoxy - 13β-ethylgona-1,3,5(10),8-tetraen-17α-ol and the resultant solution is cooled to −50° C. To the solution, there is added 1.2 g. of metallic lithium, followed by stirring. After 30 minutes, 20 ml. of ethanol is added dropwise to the reaction solution and then the resultant solution is left standing at room temperature to remove ammonia. To the residue, there are added water and ether, and the mixture is shaken, followed by separation of the ether layer. After the ether layer is washed with water and dried, it is subjected to evaporation to remove the solvent and to give 0.5 g. of (±)3-methoxy-13β-ethylgona-2,5(10)-dien-17α-ol as orange oil.

(7) (±)3-methoxy-13β-ethylgona-2,5(10)-dien-17-one

A solution of 0.2 g. of (±)3-methoxy-13β-ethylgona-2,5(10)-dien-17α-ol in 50 ml. of toluene is concentrated to about 20 ml. and to the solution, there is added 0.2 g. of aluminum isopropoxide, followed by refluxing for 3 hours. To the reaction solution, there is added water, followed by neutralization with diluted sulfuric acid and by steam distillation. The residue is extracted with ether and the ether layer, after being washed with water and dried, is subjected to evaporation to remove the solvent to give 0.1 g. of (±)3-methoxy-13β-ethylgona-2,5(10)-dien-17-one, which is recrystallized from ether and then from a mixture of ethyl acetate and hexane to give crystals melting at 158–160° C.

*Elementary analysis.*—Calculated for $C_{20}H_{28}O_2$ (percent): C, 80.00; H, 9.33. Found (percent): C, 80.08; H, 9.39.

EXAMPLE 3

(1) (±)3-methoxy-17α-hydroxy-8,14-secoestra-1,3,5(10),9-tetraen-14-one 17-hydrogensuccinate To a solution of 2 g. of (±)3-methoxy-17α-hydroxy-8,14-secoestra-1,3,5(10),9-tetraen-14 - one in 15 ml. of pyridine, there is added 4 g. of succinic acid anhydride and the mixture is stirred for 20 hours at 75–80° C. After cooling the reaction solution, water is added thereto, followed by extracting with ether. The ether layer, after being washed with water and dried, is subjected to evaporation to remove the solvent. To the residue, there is added a small volume of ethyl acetate to give crystals, which are recrystallized from ethyl acetate to yield 2.1 g. of (±)3-methoxy - 17α - hydroxy - 8,14-secoestra-1,3,5(10), 9-tetraen-14 - one 17 - hydrogensuccinate. Melting point: 121–3° C.

*Elementary analysis.*—Calculated for $C_{23}H_{28}O_2$ (percent): C, 68.98; H, 7.04. Found (percent): C, 69.20; H, 6.98.

Ultraviolet absorption:

$\lambda_{max.}^{ethanol}$ mμ(ε):265 (20570).

Infrared absorption:

$\nu_{max.}^{nujol}$ cm.$^{-1}$; 1735, 1718.

(2) Quinine salt of (±)3 - methoxy-17α-hydroxy-8,14-secoestra-1,3,5(10),9-tetraen-14 - one 17 hydrogensuccinate To a solution of 3 g. of (±)3-methoxy-17α-hydroxy-8,14-secoestra-1,3,5(10),9-tetraen-14-one 17 - hydrogensuccinate in 25 ml. of acetone, there is added a solution of 2.43 g. of quinine dissolved in a mixture of 20 ml. of acetone and 4 ml. of methanol and the resultant solution is left standing at about 5° C. to precipitate the quinine salt of (±)3 - methoxy - 17α - hydroxy-8,14-secogona-1,3,5(10),9-tetraen-14 - one 17 - hydrogensuccinate, followed by filtration. The precipitate is recrystallized from a mixture of methanol and acetone to give 2.1 g. of crystals melting at 170–171° C. $(\alpha)_D^{23}$ +26° (c.=1.0, $CHCl_3$). The mother liquor is concentrated to give 2.3 g. of oil. $(\alpha)_D^{23}$ +118° (c.=1.0, $CHCl_3$).

(3) (−)3-methoxy-17α-hydroxy-8,14-secoestra-1,3,5(10),9-tetraen-14-one

In 30 ml. of chloroform, there is dissolved 2.2 g. of oil having the optical activity $(\alpha)_D^{23}$ +118°, obtained above (2). The solution is shaken with 20 ml. of 10% sulfuric acid, followed by separation of the chloroform layer, which is extracted twice with 10% sulfuric acid. After the chloroform layer is washed with water and dried, it is subjected to evaporation to remove the solvent. The residue is dissolved in 20 ml. of methanol and to the solution, there is added 14 ml. of 10 normal-aqueous solution of potassium hydroxide under ice-cooling, followed by stirring for 1 hour. After addition of water the reaction solution is extracted with ether, and the ether layer, after being washed with water and dried, is subjected to evaporation to remove the solvent. The residue is recrystallized from a mixture of methanol and water to give 0.8 g. of (−)3-methoxy-17α-hydroxy-8,14-secoestra-1,3,5(10),9-tetraen-14-one as needles melting at 102–103° C. $(\alpha)_D^{24}$ −83.6° (c.=1.0, $CHCl_3$).

From 1.4 g. of crystals having the optical activity of $(\alpha)_D^{23}$ +26°, prepared above (2), there is obtained in the same manner as above 0.5 g. of (+)3-methoxy-17α-hydroxy-8,14-secoestra-1,3,5(10),9-tetraen-14-one as colorless needles melting at 102–104° C. $(\alpha)_D^{24}$ +81.6° (c.=1, $CHCl_3$).

(4) (−)3-methoxyestra-1,3,5(10),8,14-pentaen-17α-ol

To a solution of 0.6 g. of (−)3-methoxy-17α-hydroxy-8,14-secoestra-1,3,5(10),9-tetraen-14-one in 16 ml. of methanol, there is added 2.7 ml. of concentrated hydrochloric acid and the mixture is refluxed for 40 minutes under moderate stirring. The reaction solution is poured into the water and extracted with benzene, followed by separation of the benzene layer. After being washed with water and dried, the benzene layer is subjected to evaporation to remove the solvent, followed by allowing the residue to stand at room temperature to precipitate crystals, which are recrystallized from a small amount of methanol to give 0.55 g. of (−)3 - methoxyestra-1,3,5(10),8,14-pentaen-17α-ol as colorless needles melting at 63–64° C. $(\alpha)_D^{24}$ −190°.

From 0.45 g. of (+)3-methoxy-17α-hydroxy-8,14-secoestra-1,3,5(10),9-tetraen-14-one, there is obtained in the same manner as above 0.4 g. of (+)3-methoxyestra-1,3,5(10),8,14-pentaen-17α-ol as crystals melting at 63–64° C. $(\alpha)_D^{24}$ +190.8° (c.=0.5, $CHCl_3$).

(5) (−)3-methoxyestra-1,3,5(10),8-tetraen-17α-ol

To a solution of 0.6 g. of (−)3 - methoxyestra-1,3,5(10),8,14-pentaen-17α-ol in 30 ml. of dioxane, there is added 0.4 g. of Raney nickel. The mixture is shaken in a hydrogen gas stream until 47 ml. of hydrogen gas is absorbed. Then the catalyst is filtered off and the filtrate is concentrated to give crystals. The crystals are recrystallized from ether to give 0.5 g. of (−)3-methoxyestra-1,3,5(10),8-tetraen-17α-ol as plates melting at 113–116° C. $(\alpha)_D^{24}$ −31.5° (c.=1.0, $CHCl_3$).

From 0.45 g. of (+)3-methoxyestra-1,3,5(10),8,14-pentaen-17α-ol, there is prepared in the same manner as above 0.4 g. of (+)3-methoxyestra-1,3,5(10),8-tetraen-17α-ol. $(\alpha)_D^{24}$ +41.3° (c.=1.0, $CHCl_3$).

(6) (+)3-methoxyestra-1,3,5(10)-trien-17α-ol

In a mixture of 20 ml. of dioxane, 40 ml. of tetrahydrofuran and 250 ml. of liquid ammonia, there is dissolved 0.4 g. of (−)3-methoxyestra-1,3,5(10),8-tetraen-17α-ol. $(\alpha)_D^{24}$ +41.3° (c.=1.0, CHCl$_3$). potassium under cooling at −30−∼−50° C., followed by stirring for 2 hours. To the reaction solution, there is added ammonium chloride to decompose excess potassium. So-treated reaction solution is then allowed to stand at room temperature to remove liquid ammonia completely. The residue is dissolved in water, and the mixture is extracted with benzene. The benzene layer, after being washed with water and dried, is subjected to evaporation to remove the solvent. The solid residue is recrystallized from a mixture of water and ethanol to give 0.35 g. of (+)3-methoxyestra-1,3,5(10)-trien-17α-ol as needles melting at 96–100° C. $(\alpha)_D^{24}$ +17.6° (c.=0.5, CHCl$_3$).

From 0.4 g. of (+)3-methoxyestra-1,3,5(10),8-tetraen-17α-ol, there is prepared in the same manner as above 0.33 g. of (−)3-methoxyestra-1,3,5(10)-trien-17α-ol as crystals melting at 96–99° C. $(\alpha)_D^{24}$ −17.6° (c.=0.5, CHCl$_3$).

(7) (+)3-methoxyestra-1,3,5(10)-trien-17-one

To a solution of 0.2 g. of (+)3-methoxyestra-1,3,5(10)-trien-17α-ol in 20 ml. of acetone, there is added gradually 0.25 ml. of an aqueous solution containing 26.72 g. of chromic acid anhydride and 23 ml. of concentrated sulfuric acid per 100 ml. followed by shaking. To the reaction solution, there is added methanol to decompose excess chromic acid. The resultant solution is diluted with water to precipitate crystals, which are separated by filtration. After being washed with water, the crystals are recrystallized from ethanol to give 0.2 g. of (+)3-methoxyestra-1,3,5(10)-trien-17-one. Melting point: 165–168° C. $(\alpha)_D^{24}$ +167° (c.=1, CHCl$_3$).

From 0.3 g. of (−)3-methoxyestra-1,3,5(10)-trien-17α-ol, there is prepared in the same manner as above 0.25 g. of (−)3-methoxyestra-1,3,5(10)-trien-17-one. Melting point: 162–168° C. $(\alpha)_D^{24}$ −147.6° (c.=1, CHCl$_3$).

EXAMPLE 4

3-methoxy-8,14-secoestra-1,3,5(10),9-tetraen-14,17-dione

In a solution containing 20 ml. of dimethylsulfoxide, 7 g. of dicyclohexylcarbodiimide, 9.6 ml. of pyridine, 0.48 ml. of trifluoroacetic acid and 18 ml. of benzene, there is dissolved 3.6 g. of (+)3-methoxy-17α-hydroxy-8,14-secoestra-1,3,5(10),9-tetraen-14-one and the resultant solution is allowed to stand at room temperature overnight. After ether is added to the reaction solution, methanol solution of oxalic acid is added and the mixture solution is allowed to stand until bubbling ceases.

To the resultant solution, there is added water to precipitate dicyclohexylurea, which is filtered off. After being washed with water, the ether layer is subjected to evaporation to remove the solvent. The oily residue is chromatographed on a column of silica gel, and 3 g. of 3-methoxy-8,14-secoestra-1,3,5(10),9-tetraene-14,17-dione is separated from the eluate with a mixture of benzene and ether. Melting point: 78° C.

EXAMPLE 5

(1) 1-menthoxyacetate of (±)3-methoxy-17α-hydroxy-8,14-secoestra-1,3,5(10),8-tetraen-14-one To a mixture of 0.4 g. of (±)3-methoxy-17α-hydroxy-8,14-secoestra-1,3,5(10),9(11)-tetraen-14-one dissolved in a mixture of 0.13 ml. of pyridine and 1.5 ml. of dioxane, there is added 0.37 g. of 1-menthoxyacetyl chloride. The whole mixture is allowed to stand at room temperature overnight. To the reaction solution, there is added water and then the aqueous solution is extracted with ether. The ether layer, after being washed with water and dried, is subjected to evaporation to remove the solvent. The residue is subjected to chromatography on a column of 20 g. of silica gel, and from the eluate with a mixture of benzene and ether (4:1), there is obtained 0.7 g. of 1-menthoxyacetate of (±)3-methoxy-17α-hydroxy-8,14-secoestra-1,3,5(10),8-tetraen-14-one as colorless oil.

The menthoxyacetate is dissolved in hot methanol and the solution is cooled at −40° C. to separate oil, which is purified by repetition of dissolving in hot methanol and cooling several times. Thus-obtained colorless oil is allowed to stand under cooling to precipitate crystals. The crystals are recrystallized from methanol to give 0.12 g. of 1-menthoxyacetate of (+)3-methoxy-17α-hydroxy-8,14-secoestra-1,3,5(10),8-tetraen-14-one. Melting point: 88–90° C. $(\alpha)_D^{24}$ −3° (c.=0.5, CHCl$_3$).

The combined mother liquor is concentrated to give 0.4 g. of 1-menthoxyacetate of (−)3-methoxy-17α-hydroxy-8,14-secoestra-1,3,5(10),8-tetraen-14-one as colorless oil. $(\alpha)_D^{24}$ −50.3° (c.=0.5, CHCl$_3$).

(2) 3-methoxy-17α-hydroxy-8,14-secoestra-1,3,5(10),8-tetraen-14-one

To a solution of 0.1 g. of 1-menthoxyacetate of (+)3-methoxy-17α-hydroxy-8,14-secoestra-1,3,5(10),8-tetraen-14-one in 5 ml. of ethanol is added 1 ml. of ethanol solution of 1-normal potassium hydroxide, followed by stirring for 20 minutes at room temperature. To the reaction solution, there is added water and the resultant solution is extracted with ether. The ether layer, after being washed with water and dried, is subjected to evaporation to remove the solvent to give 0.07 g. of (+)3-methoxy-17α-hydroxy-8,14-secoestra-1,3,5(10),8-tetraen-14-one as pale yellowish oil. $(\alpha)_D^{25}$ +48° (c.=1.0, CHCl$_3$).

Infrared absorption:

$$\nu_{max.}^{CHCl_3}$$

cm.$^{-1}$:3500(OH), 1730(C=O), 1605, 1568, 1490 (aromatic ring).

From 0.3 g. of 1-menthoxyacetate of (−)3-methoxy-17α-hydroxy-8,14-secoestra-1,3,5(10),8-tetraen-14-one, there is prepared in the same manner as above 0.15 g. of (−)3-methoxy-17α-hydroxy-8,14-secoestra-1,3,5(10),9-tetraen-14-one. $(\alpha)_D^{25}$ −48° (c.=1.0, CHCl$_3$).

Infrared absorption:

$$\nu_{max.}^{CHCl_3}$$

cm.$^{-1}$:3500(OH), 1730(C=O), 1605, 1568, 1485 (aromatic ring).

(3) (−)3-methoxyestra-1,3,5(10),8,14-pentaen-17α-ol

Thus-obtained (−)3-methoxy-17α-hydroxy-8,14-secoestra-1,3,5(10),9-tetraen-14-one is converted to (−)3-methoxyestra-1,3,5(10),8,14-pentaen-17α-ol in the same manner as in Example 3(4).

(4) 3-methoxy-8,14-secoestra-1,3,5(10),9-tetraene-14,17-dione

To a solution of 0.05 g. of (+)3-methoxy-17α-hydroxy-8,14-secoestra-1,3,5(10),9-tetraen-14-one in 5 ml. of acetone, there is added 1 ml. of an aqueous solution containing 26.72 g. of chromic acid anhydride and 23 ml. of concentrated sulfuric acid per 100 ml., followed by shaking. The reaction solution is extracted with ether. After the ether layer is washed with an aqueous solution of sodium hydrogen carbonate and then with water and dried, it is subjected to evaporation to remove the solvent and to give 0.045 g. of (±)3-methoxy-8,14-secoestra-1,3,5(10),9-tetraene-14,17-dione.

EXAMPLE 6

(1) (−)17α-acetoxy-3-methoxy-8,14-secoestra-1,3,5(10),9-tetraen-14-ol

In 100 ml. of methanol, there is dissolved 2.4 g. of (−)17α-acetoxy-3-methoxy-8,14-secoestra-1,3,5(10),9- tetraen-14-one (($\alpha$)$_D$ —71°). To the solution, there is added 0.3 g. of sodium borohydrate under cooling at —20° C., followed by stirring for 1.5 hours. To the reaction solution, there is added water, and then the mixed solution is extracted with ether. The ether layer, after being washed with water and dried, is concentrated to give 2.4 g. of (—)17$\alpha$-acetoxy-3-methoxy-8,14-secoestra-1,3,5(10),9-tetraen-14-ol as colorless oil, ($\alpha$)$_D^{26}$ —11.1° (c.=1, chloroform).
Infrared absorption:

$$\nu_{max.}^{film}$$

cm.$^{-1}$:3450(OH), 1730(ester), 1605, 1570, 1495 (aromatic ring).

(2) (—)17$\alpha$-acetoxy-3-methoxy-9,14-oxido-8,14-secoestra-1,3,5(10)-triene

A solution of 2.4 g. of (—)17$\alpha$-acetoxy-3-methoxy-8,14-secoestra-1,3,5(10),9-tetraen-14-ol dissolved in 100 ml. of benzene is concentrated to 10 ml. On the other hand, a solution of 0.1 g. of para-toluenesulfonic acid dissolved in 100 ml. of benzene is concentrated to 10 ml., to which the former solution is then added, followed by allowing to stand for 30 minutes at room temperature. The reaction solution is shaken with an aqueous solution of sodium hydrogen carbonate, followed by separation of the benzene layer. After the benzene layer is washed with water and dried, it is subjected to evaporation under reduced pressure to remove the solvent. The residue is purified by chromatography on a silica gel column, and from benzene eluate, there is obtained 2.3 g. of (—)17$\alpha$-acetoxy-3-methoxy - 9,14 - oxido-8,14-secoestra-1,3,5(10)-triene as colorless oil. ($\alpha$)$_D^{24}$ —20.8° (c.=1, chloroform).
Infrared absorption:

$$\nu_{max.}^{film}$$

cm.$^{-1}$:1730(ester), 1610, 1575, 1500 (aromatic ring).
Ultraviolet absorption:

$$\lambda_{max.}^{ethanol}$$

m$\mu$ ($\epsilon$):277 (1820), 283 (1720).

(3) (—)3-methoxy-9,14-oxido-8,14-secoestra-1,3,5(10)-trien-17-ol

To a solution of 2.3 g. of (—)17$\alpha$ - acetoxy - 3 - methoxy - 9,14 - oxido - 8,14 - secoestra - 1,3,5(10) - triene in 30 ml. of ethanol, there is added 20 ml. of ethanol solution of 1-normal potassium hydroxide, followed by stirring for one hour at room temperature. To the reaction solution, there is added water and the mixture is extracted with ether. After the ether layer is washed with water and dried, it is subjected to evaporation to remove the solvent and to give 1.9 g. of (—) 3 - methoxy - 9,14-oxido - 8,14 - secoestra - 1,3,5(10) - trien - 17 - ol as colorless oil.
Infrared absorption:

$$\nu_{max.}^{film}$$

cm.$^{-1}$:3400(OH), 1610, 1580, 1500 (aromatic ring).

(4) (+)3-methoxy-9,14-oxido-8,14-secoestra-1,3,5(10)-trien-17-one

To a solution of 2 g. of chromic acid anhydride in 30 ml. of pyridine, there is added a solution of 1.9 g. of (—)3 - methoxy - 9,14 - oxido - 8,14 - secoestra-1,3,5(10)-trien-17-ol dissolved in 10 ml. of pyridine, followed by stirring for 30 minutes at room temperature. The reaction solution is poured into water and the mixture is extracted with ether. The ether layer is washed with diluted sulfuric acid, with an aqueous solution of sodium hydrogen carbonate and then with water, and dried, followed by concentration to give 1.65 g. of (+)3-methoxy - 9,14 - oxido - 8,14 - secoestra - 1,3,5(10)-trien - 17 - one as the residue which is then purified by chromatography to obtain crystals melting at 77–80° C. ($\alpha$)$_D^{26}$ +35° (c.=1, chloroform).

Infrared absorption:

$$\nu_{max.}^{nujol}$$

cm.$^{-1}$:1734 (oxo radical), 1615, 1580, 1500 (aromatic ring).
Ultraviolet absorption:

$$\lambda_{max.}^{ethanol}$$

m$\mu$ ($\epsilon$):276 (1870), 283 (1740).

(5) (+)3-methoxyestra-1,3,5(10),8,14-pentaen-17$\alpha$-ol

To a solution of 1.4 g. of (+)3-methoxy-9,14-oxido-8, 14 - secoestra - 1,3,5(10) - trien - 17 - one in 30 ml. of methanol, there is added 5 ml. of concentrated hydrochloric acid, followed by refluxing for 30 minutes. To the reaction solution, there is added water and the mixture is extracted with ether. The ether layer is washed with an aqueous solution of sodium hydrogen carbonate and with water and dried, and then subjected to evaporation to remove the solvent. From the residue, there is obtained 1.2 g. of (+)3 - methoxyestra - 1,3,5(10),8,14-pentaen - 17$\alpha$ - ol as crystals melting at 60–66° C. ($\alpha$)$_D^{26}$ +194° (c.=1, chloroform).
Infrared absorption:

$$\nu_{max.}^{nujol}$$

cm.$^{-1}$:3400(OH).
Ultraviolet absorption:

$$\lambda_{max.}^{ethanol}$$

m$\mu$($\epsilon$): 3.11.

EXAMPLE 7

(+)3-methoxy-13-ethylgona-1,3,5(10),8,14-pentaen-17$\alpha$-ol

To a solution of 1 g. of ($\pm$)3-methoxy - 9,14 - oxido-13 - ethyl - 8,14 - secogona - 1,3,5(10) - trien - 17 - one in 40 ml. of methanol, there is added 10 ml. of concentrated hydrochloric acid, followed by refluxing for one hour. To the reaction solution, there is added water and the mixture is extracted with ether. The ether layer is washed with an aqueous solution of sodium hydrogen carbonate and then with water and dried, and subjected to evaporation to remove the solvent to give about 1 g. of ($\pm$)3 - methoxy - 13 - ethylgona - 1,3,5(10),8,14-pentaen - 17$\alpha$ - ol as oil.
Ultraviolet absorption:

$$\lambda_{max.}^{ethanol}$$

m$\mu$ ($\epsilon$):310 (24000).

EXAMPLE 8

(1) (+)17$\alpha$-hydrogensuccinoyloxy-3-methoxy-8,14-secoestra-1,3,5(10),9-tetraen-14-ol To a solution of 2.2 g. of (+)17$\alpha$-hydrogensuccinoyloxy - 3 - methoxy - 8,14 - secoestra - 1,3,5(10),9 - tetraen-14-one in a mixture of 5 ml. of pyridine and 5 ml. of water, there is added 0.1 g. of sodium borohydride under cooling at —10°–0° C., followed by stirring. After one hour, water is added to the reaction and the mixture is adjusted to about pH 5 with hydrochloric acid, followed by extraction with ether. After the ether layer is washed with water and dried, it is concentrated to obtain (+)17$\alpha$-hydrogensuccinoyloxy - 3 - methoxy - 8,14 - secoestra-1,3,5(10),9-tetraen-14-ol.

(2) (+)3-methoxy-9,14-oxido-8,14-secoestra-1,3,5(10)-trien-17-ol

Thus-obtained (+)17$\alpha$ - hydrogensuccinoyloxy-3-methoxy - 8,14 - secoestra - 1,3,5(10),9 - tetraen - 14 - ol is converted to 1 g. of (+)3 - methoxy - 9,14 - oxido-8,14 - secoestra - 1,3,5(10) - trien - 17 - ol in the same manner as in Example 6(2) and (3).

(3) (—)3-methoxy-9,14-oxido-8,14-secoestra-1,3,5(10)-trien-17-one

Thus-obtained (+)3 - methoxy - 9,14 - oxido - 8,14-secoestra - 1,3,5(10) - trien - 17 - ol is converted to 0.8 g. of (—)3 - methoxy - 9,14 - oxido - 8,14 - secoestra-1,3,5(10) - trien - 17 - one as oil in the same manner as in Example 6(4). $(\alpha)_D^{26}$ —35° (c.=1, chloroform).

(4) (—)3-methoxyestra-1,3,5(10),8,14-pentaen-17α-ol

Thus-obtained (—)3 - methoxy - 9,14 - oxido - 8,14-secoestra - 1,3,5(10) - trien - 17 - one is converted to 0.8 g. of (—)3-methoxyestra - 1,3,5(10),8,14 - pentaen-17α-ol as oil in the same manner as in Example 6(5), and is recrystallized from methanol to give needles melting at 63–64° C. $(\alpha)_D^{24}$ —200°.

EXAMPLE 9

(+)3-methoxyestra-2,5(10)-dien-17-one (—)3 - methoxyestra - 1,3,5(10),8 - tetraen - 17α - ol obtained in Example 3(5) is converted to (+)3-methoxyestra - 2,5(10) - dien - 17α - ol in the same manner as in Example 1(6). Thus-obtained dienol is further converted to (+)3 - methoxyestra - 2,5(10) - dien - 17 - one in the same manner as in Example 1 (7–1). Melting point: 123–6° C.

Infrared absorption:

$\nu_{max.}^{nujol}$ (cm.$^{-1}$):1740 (carbonyl radical); 1700, 1667 (double bond).

Having thus disclosed the invention, what is claimed is:

1. In a method for the total synthesis of 3-methoxy 13-substituted 17 - oxygenated gona-1,3,5(10)-triene starting from 3-methoxy 13-substituted 8,14-secogona-1,3,5(10),9-tetraene-14,17-dione, the substituent at the 13-position being a hydrocarbon group having at most 7 carbon atoms, the improvement which comprises (1) first reducing said 3-methoxy 13-substituted 8,14-secogona-1,3-5(10),9-tetraene-14,17-dione with a member selected from the group consisting of metallic hydride complexes and aluminum alkoxides, each alkyl of the alkoxide having at most 4 carbon atoms, to produce, as a racemic mixture, the corresponding 3-methoxy 13-substituted 17α-hydroxy-8,14-secogona-1,3,5(10),9-tetraen-17 - one, and then (2) subjecting the so-obtained product to ring-closure, under strongly acidic conditions to produce the corresponding 3-methoxy 13-substituted gona-1,3,5(10)-8,14-pentaen-17α-ol.

2. In a method for the total synthesis of 3-methoxy 13-substituted 17-oxygenated gona-1,3,5(10)-triene starting from 3-methoxy 13-substituted 8,14-secogona-1,3,5(10),9-tetraene-14,17-dione, the substitutent at the 13-position being a hydrocarbon group having at most 7 carbon atoms, the improvement which comprises (1) first reducing said 3-methoxy 13-substituted 8,14-secogona-1,3-5(10),9-tetraene-14,17-dione with a member selected from the group consisting of metallic hydride complexes and aluminum alkoxides, each alkyl of the alkoxide having at most 4 carbon atoms, to produce, as a racemic mixture, the corresponding 3-methoxy 13-substituted 17α-hydroxy - 8,14 - secogona-1,3,5(10),9-tetraen-17-ones, (2) subjecting the racemic mixture to optical resolution into an isomer having the configuration of the formula

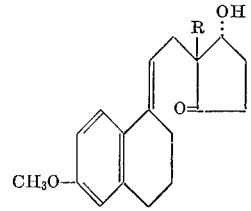

where R is the substituent at the 13-position, and its antipode, and then (3) subjecting the optically active isomer of the configuration of Formula I to ring-closure under strongly acidic conditions to produce optically active 3-methoxy 13-substituted gona-1,3,5(10),8,14-pentaen-17α-ols.

3. The improvement according to claim 2, wherein the antipode of the compound having the configuration of Formula I is subjected to the following sequence of reaction steps:

(1) step of allowing the antipode to react with an acylating agent to produce optically active 3-methoxy 13 - substituted 17α - acyloxy - 8,14-secogona - 1,3-5(10),9-tetraen-14-one;
(2) step of reducing the so-obtained compound with a metallic complex;
(3) step of subjecting the so-obtained compound to mild or strongly acidic conditions to produce optically active 3-methoxy 13-substituted 17α-acyloxy-9,14-oxido-8,14-secogona-1,3,5(10),9-tetraene;
(4) step of subjecting to so-obtained compound to hydrolysis in the presence of an alkali catalyst to produce optically active 3-methoxy 13-substituted-9,14-oxido-8,14-secogona-1,3,5(10),9-tetraen-17-ol;
(5) step of subjecting the so-obtained compound to oxidation to produce optically active 3-methoxy 13-substituted - 9,14 - oxido-8,14-secogona-1,3,5(10),9-tetraen-17-one; and
(6) step of subjecting to so-obtained compound to strongly acidic conditions to produce the same optically active 3-methoxy 13-substituted gona-1,3,5(10), 8,14-pentaen-17-ol as the product from the isomer having the configuration of Formula I, whereby no loss of the 3-methoxy 13-substituted 17α-hydroxy-8,14-secogona-1,3,5(10),9-tetraen-17-one is entailed.

4. The improvement according to claim 2, wherein the antipode of the compound having the configuration of the Formula I is subjected to oxidation to regain the starting 3 - methoxy - 13-substituted 8,14 - secogona-1,3-5(10),9-tetraene-14,17-dione.

References Cited

UNITED STATES PATENTS

| | | | |
|---|---|---|---|
| 3,391,165 | 7/1968 | Hughes et al. | 260—397.4 |
| 3,407,217 | 10/1968 | Hughes et al. | 260—397.4 |

FOREIGN PATENTS

| | | | |
|---|---|---|---|
| 991,593 | 5/1965 | England | 260—397.4 |
| 1,010,051 | 11/1965 | England | 260—397.4 |

ELBERT L. ROBERTS, Primary Examiner

U.S. Cl. X.R.

260—345.2, 397.4, 586, 619, 999